United States Patent
Kim et al.

(10) Patent No.: US 7,944,540 B2
(45) Date of Patent: May 17, 2011

(54) COLOR FILTER ON THIN FILM TRANSISTOR TYPE LIQUID CRYSTAL DISPLAY DEVICE AND METHOD OF FABRICATING THE SAME

(75) Inventors: Woong-Kwon Kim, Gyeonggi-do (KR); Dong-guk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/588,012

(22) Filed: Sep. 30, 2009

(65) Prior Publication Data
US 2010/0022156 A1    Jan. 28, 2010

Related U.S. Application Data

(62) Division of application No. 10/999,000, filed on Nov. 30, 2004, now Pat. No. 7,612,860.

(30) Foreign Application Priority Data

Dec. 1, 2003  (KR) .............................. 2003-0086271
Dec. 1, 2003  (KR) .............................. 2003-0086272

(51) Int. Cl.
    *G02F 1/1333*    (2006.01)
    *G02F 1/1337*    (2006.01)
(52) U.S. Cl. ......... 349/158; 349/106; 349/123; 349/187
(58) Field of Classification Search .................. 349/158, 349/106, 123, 187
    See application file for complete search history.

(56) References Cited

U.S. PATENT DOCUMENTS

| 6,300,926 B1 * | 10/2001 | Yoneya et al. .................. 345/87 |
| 6,429,917 B1 | 8/2002 | Okamoto et al. |
| 6,649,952 B2 | 11/2003 | Sawada |
| 6,958,792 B2 | 10/2005 | Lan et al. |
| 2003/0030769 A1 | 2/2003 | Hong et al. |
| 2003/0117573 A1 * | 6/2003 | Yi et al. ......................... 349/158 |

FOREIGN PATENT DOCUMENTS

| JP | 10-170930 | 6/1998 |
| JP | 11-024079 | 1/1999 |
| JP | 11-295744 | 10/1999 |
| JP | 2000-250021 | 9/2000 |
| KR | 10-2001-0043102 A | 5/2001 |
| KR | 10-2002-0071542 A | 9/2002 |
| KR | 10-2003-0054141 | 7/2003 |

* cited by examiner

*Primary Examiner* — David Nelms
*Assistant Examiner* — Nathanael R Briggs
(74) *Attorney, Agent, or Firm* — McKenna Long & Aldridge LLP

(57) ABSTRACT

A liquid crystal panel for a color filter on thin film transistor (COT) type liquid crystal display (LCD) device includes: first and second substrates facing each other and having a display area and a non-display area, the non-display area is at a periphery of the display area; a gate line and a data line on the first substrate, the gate line and the data line crossing each other to define a pixel region in the display area; a thin film transistor connected to the gate line and the data line; a color filter layer over the thin film transistor; a black matrix on the color filter layer; a pixel electrode contacting the thin film transistor on the color filer layer; a common electrode on the second substrate; a first alignment key on the second substrate in the non-display area; a sealant between the first and second substrates at a boundary between the display area and the non-display area; and a liquid crystal layer between the pixel electrode and the common electrode.

14 Claims, 10 Drawing Sheets

COLOR FILTER ON THIN FILM TRANSISTOR TYPE LIQUID CRYSTAL DISPLAY DEVICE AND METHOD OF FABRICATING THE SAME

This application is a divisional application of U.S. patent application Ser. No. 10/999,000, filed Nov. 30, 2004 now U.S. Pat. No. 7,612,860, which claims the benefit of Korean Patent Application No. 2003-0086271, filed on Dec. 1, 2003 and Korean Patent Application No. 2003-0086272, filed on Dec. 1, 2003, all of which are hereby incorporated by reference for all purposes as if fully set forth herein.

BACKGROUND OF THE INVENTION

1. Field of the Invention

The present invention relates to a liquid crystal display device, and to a method of fabricating a liquid crystal display device, particularly a color filter on thin film transistor (COT) type liquid crystal display (LCD) device and a method of fabricating the same.

2. Discussion of the Related Art

In general, liquid crystal display (LCD) devices make use of optical anisotropy and polarization properties of liquid crystal molecules to produce images. When an electric field is applied to liquid crystal molecules, the liquid crystal molecules are rearranged. As a result, the transmittance of the liquid crystal molecules is changed according to the alignment direction of the rearranged liquid crystal molecules.

The LCD device includes two substrates disposed with their respective electrodes facing each other, and a liquid crystal layer is interposed between the respective electrodes. When a voltage is applied to the electrodes, an electric field is generated between the electrodes to modulate the light transmittance of the liquid crystal layer by rearranging liquid crystal molecules, thereby displaying images.

FIG. 1 is an exploded perspective view of a liquid crystal display panel according to the related art. As shown in FIG. 1, a liquid crystal panel 11 includes an upper substrate 5, a lower substrate 22 and a liquid crystal material 14 interposed between the upper and lower substrates 5 and 22. A black matrix 6 is formed on the upper substrate 5 and a color filter layer 8 including sub-color filters is formed on the black matrix 6. A common electrode 18 is formed on the color filter layer 8. A pixel electrode 17 and a thin film transistor (TFT) "T" used as a switching element are formed on the lower substrate 22 in a pixel region "P." The pixel electrode 17 is formed of a transparent conductive material, such as indium-tin-oxide (ITO) and indium-zinc-oxide (IZO). The pixel region "P" is defined by a gate line 13 and a data line 15 and the TFT "T" disposed in matrix is connected to the gate line 13 and the data line 15.

A storage capacitor "C" is connected in parallel to the pixel electrode 17 and formed over the gate line 13. A portion of the gate line 13 is used as a first electrode of the storage capacitor "C", and a metal pattern 30 with an island shape, which is in the same layer and is the same material as the source and drain electrodes of the TFT "T," is used as a second electrode of the storage capacitor "C." Because the metal pattern 30 is connected to the pixel electrode 17, the same signal is applied to the metal pattern 30 and the pixel electrode 17.

The upper substrate 5 and the lower substrate 22 may be referred to as a color filter substrate and an array substrate, respectively. Although not shown in FIG. 1, the liquid crystal panel 11 may be embedded between top case and a bottom case to constitute a liquid crystal display (LCD) device.

FIG. 2 is a schematic cross-sectional view of an LCD device according to the related art. In FIG. 2, a liquid crystal panel "D" includes a first substrate 40, a second substrate 70 and liquid crystal (not shown) interposed between the first and second substrates 40 and 70. A polarizing film 80 is formed on an outer surface of the second substrate 70 and the liquid crystal panel "D" is fixed using a top case "TC." A thin film transistor (TFT) "T" including a gate electrode 42, an active layer 50, a source electrode 58 and a drain electrode 60 is formed on the first substrate 40. In addition, a gate line 14 and a data line (not shown) crossing each other to define a pixel region "P" are formed on the first substrate 40. A gate pad 46 is formed on one end of the gate line 14 and a gate pad terminal 66 of a transparent conductive material is formed on the gate pad 46. Although not shown in FIG. 3, a data pad is formed at one end of the data line with data pad terminal is formed on the data pad. The gate pad terminal 66 and the data pad terminal are connected to an external circuit (not shown).

The first substrate 40 and the second substrate 70 are attached to each other using a sealant 84. An alignment key "K" to attach the first substrate 40 and the second substrate 70. An edge portion of the second substrate 70 having the alignment key is cut out after attaching the first and second substrates 40 and 70 to expose the gate pad terminal 66 and the data pad terminal in the edge portion on the second substrate 70. A light-shielding pattern 74 is formed on a first portion of the second substrate 70 corresponding to the sealant 84. A black matrix 72 is formed on a second portion of the second substrate 70 corresponding to the TFT "T," the gate line 44 and the data line.

In general, a liquid crystal device includes a liquid crystal panel, a backlight unit, a top case and a bottom case. The top case is attached to the bottom case with the liquid crystal panel and the backlight unit within the two cases. The liquid crystal panel has a display area and a non-display area at the periphery of the display area. The display area is exposed through the top case and the non-display area is covered by the top case. However, the top case does not completely cover the non-display area of the liquid crystal panel. Accordingly, an additional light-shielding pattern is required in the non-display area of the liquid crystal panel.

The alignment key "K", the light shielding pattern 74 and the black matrix 72 are simultaneously formed using a first mask process on the second substrate 70. A color filter layer 76 is formed on a third portion of the second substrate 70 corresponding to the pixel region "P" using a second mask process on the second substrate 70. A common electrode 78 is formed over the entire surface of the second substrate 70 having the black matrix 72 and the color filter layer 76. Further, a patterned spacer 82 of a transparent organic material is formed on the common electrode 78 corresponding to the TFT "T" using a third mask process on the second substrate 70.

Because the liquid crystal panel "D" is obtained by attaching the lower substrate 40 having array elements such as the gate line 44, the data line and the TFT "T and the second substrate 70 having the black matrix 72 and the color filter layer 76, the liquid crystal panel "D" may deteriorate due to a light leakage resulting from an alignment error. In order to overcome these problems, a color filter on TFT (COT) type has been suggested where a color filter layer is formed on the first substrate having a TFT.

FIG. 3 is a schematic cross-sectional view of a COT type LCD device according to the related art. In FIG. 3, a COT type liquid crystal panel 100 includes a first substrate 110 and a second substrate 150 attached to each other with a sealant 180. A TFT "T" having a gate electrode 112, an active layer 120, a source electrode 122 and a drain electrode 124 is formed on the first substrate 110. In addition, a gate line 114 and a data line (not shown) crossing each other to define a pixel region "P" are formed on the first substrate 110. A gate pad 116 is formed on one end of the gate line 114 and a data pad (not shown) is formed at one end of the data line. A color filter layer 128 including red, green and blue sub-color filters (128a, 128b and not shown) and a black matrix 130 are formed on the first substrate 110 having the TFT "T." The color filter layer 128 corresponds to the pixel region "P" and the black matrix 130 corresponds to a channel region "CH" of the TFT "T." A transparent pixel electrode 134 contacting the drain electrode 124 is formed on the color filter layer 128 and a first orientation film 136 of polyimide is formed on the pixel electrode 134. A common electrode 152 is formed on the second substrate 150 and a second orientation film 154 is formed on the common electrode 152. In addition, a patterned spacer 158 is formed on the second orientation film 154 corresponding to the TFT "T."

In the COT type liquid crystal panel 100, the first and second orientation films 136 and 154 are formed so as not to contact the sealant 180 because the polyimide for the orientation films has a poor contact property with the sealant 180. When one of the first and second orientation films 136 and 154 contact the sealant 180, the sealant 180 may be broken. Accordingly, the first and second orientation films 136 and 154 are spaced apart from the sealant 180 by a predetermined distance "S1" as a fabrication margin. Since the predetermined distance "S1" causes an increase in the use of liquid crystal materials and fabrication costs, it is necessary to reduce the predetermined distance "S1." In the COT type liquid crystal panel 100, the color filter layer 128 and the black matrix 130 are formed on the first substrate 110 such that an additional deposition, photolithographic and etch steps are required to make an alignment key on the second substrate 150. Moreover, since the black matrix 130 is formed on the first substrate 110, additional deposition, photolithographic and etch steps are required to form a light-shielding pattern, which prevents leakage light at the boundary of the display area of the liquid crystal panel on the second substrate 150. Thus, in the COT-type LCD device, additional steps are required to form an alignment key and a light-shielding pattern on a second substrate, and these additional steps increase fabrication costs and fabrication time.

SUMMARY OF THE INVENTION

Accordingly, the present invention is directed to a color filter on thin film transistor (COT) type liquid crystal display (LCD) device and a method of fabricating the same that substantially obviates one or more of the problems due to limitations and disadvantages of the related art.

An object of the present invention is to provide a liquid crystal display device and a method of fabricating a liquid crystal display device having an improved production yield due to the reduced number of fabrication processes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal panel for a color filter on thin film transistor (COT) type liquid crystal display (LCD) device includes: first and second substrates facing each other and having a display area and a non-display area, the non-display area is at a periphery of the display area; a gate line and a data line on the first substrate, the gate line and the data line crossing each other to define a pixel region in the display area; a thin film transistor connected to the gate line and the data line; a color filter layer over the thin film transistor; a black matrix on the color filter layer; a pixel electrode contacting the thin film transistor on the color filer layer; a common electrode on the second substrate; a first alignment key on the second substrate in the non-display area; a sealant between the first and second substrates at a boundary between the display area and the non-display area; and a liquid crystal layer between the pixel electrode and the common electrode.

In another aspect, a method of fabricating a liquid crystal panel for a color filter on thin film transistor (COT) type liquid crystal display (LCD) device includes: forming a gate line and a data line on a first substrate having a display area and a non-display area, the non-display area is at a periphery of the display area, the gate line and the data line crossing each other to define a pixel region in the display area; forming a thin film transistor connected to the gate line and the data line; forming a color filter layer over the thin film transistor; forming a black matrix on the color filter layer; forming a pixel electrode contacting the thin film transistor on the color filter layer; forming a common electrode on a second substrate having the display area and the non-display area; forming a first alignment key on the second substrate in the non-display area; forming a sealant between the first and second substrates at a boundary between the display area and the non-display area; attaching the first and second substrates such that the pixel electrode faces the common electrode; and forming a liquid crystal layer between the pixel electrode and the common electrode.

In another aspect, a color filter on thin film transistor (COT) type liquid crystal display (LCD) device includes: first and second substrates facing each other and having a display area and a non-display area, the non-display area is at a periphery of the display area; a gate line and a data line on the first substrate, the gate line and the data line crossing each other to define a pixel region in the display area; a thin film transistor connected to the gate line and the data line; a color filter layer over the thin film transistor; a black matrix on the color filter layer; a pixel electrode contacting the thin film transistor on the color filer layer; a common electrode on the second substrate; a light-shielding pattern at a boundary between the display area and the non-display area; a patterned spacer in the display area; a sealant between the first and second substrates at the boundary between the display area and the non-display area; a liquid crystal layer between the pixel electrode and the common electrode; and a top case and a bottom case enclosing the first and second substrates therein, wherein the light-shielding pattern corresponds to end portions of the top case.

In another aspect, a method of fabricating a color filter on thin film transistor (COT) type liquid crystal display (LCD) device includes: forming a gate line and a data line on a first substrate having a display area and a non-display area, the non-display area is at a periphery of the display area, the gate line and the data line crossing each other to define a pixel region in the display area; forming a thin film transistor connected to the gate line and the data line; forming a color filter layer over the thin film transistor; forming a black matrix on the color filter layer; forming a pixel electrode contacting the thin film transistor on the color filter layer; forming a common electrode on a second substrate having the display area and the non-display area; forming a first alignment key on the second substrate in the non-display area; forming a sealant between the first and second substrate at a boundary between the display area and the non-display area; attaching the first and second substrates such that the pixel electrode faces the common electrode; forming a liquid crystal layer between the pixel electrode and the common electrode; removing a portion of the second substrate having the first alignment key; and forming a top case and a bottom case enclosing the first and second substrates therein such that the light-shielding pattern corresponds to end portions of the top case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to embodiments of the present invention, examples of which are illustrated in the accompanying drawings. Wherever possible, similar reference numbers will be used to refer to the same or similar parts.

Figure 1:
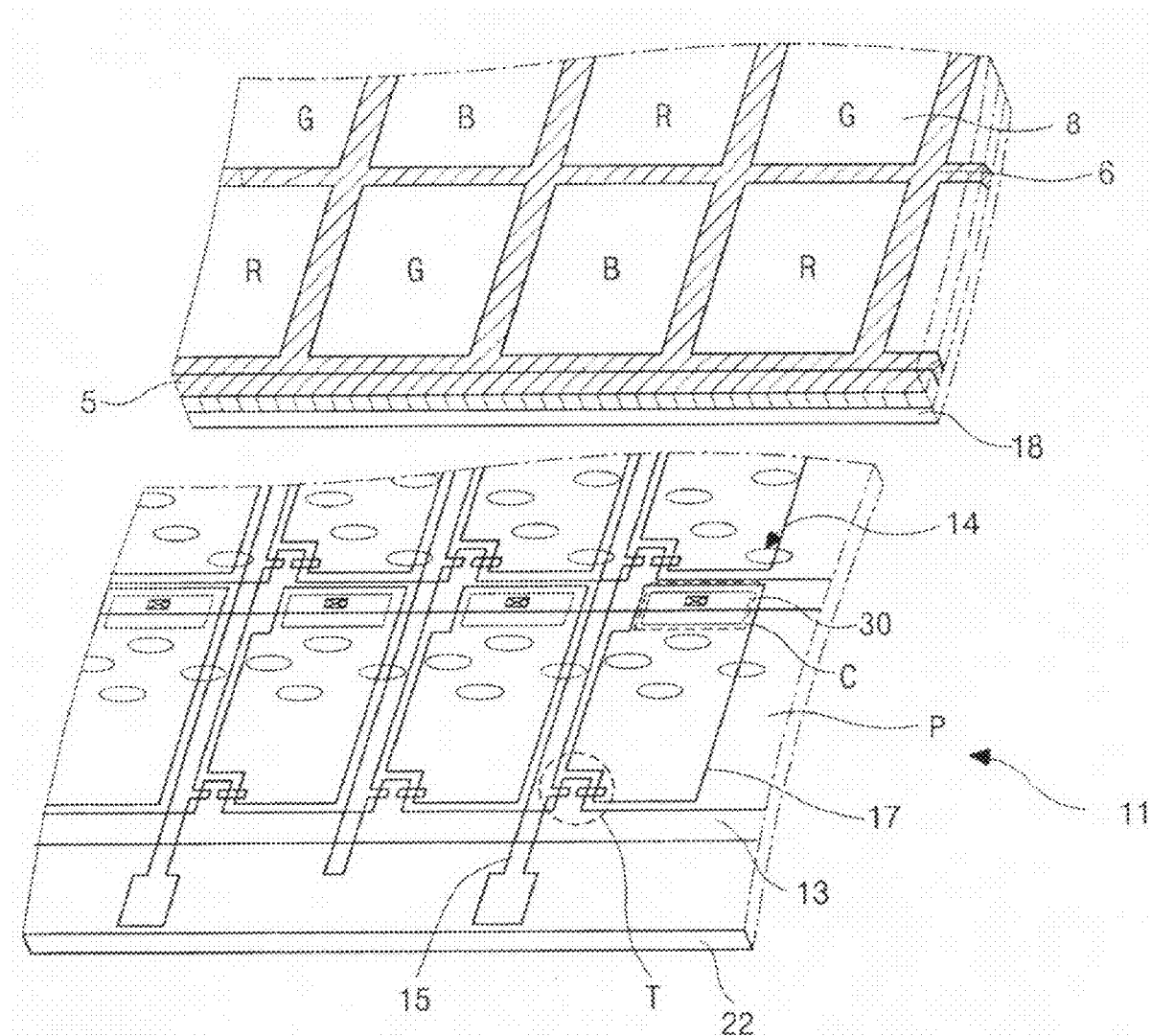
FIG. 1 is an exploded perspective view of a liquid crystal display panel according to the related art.
Figure 2:
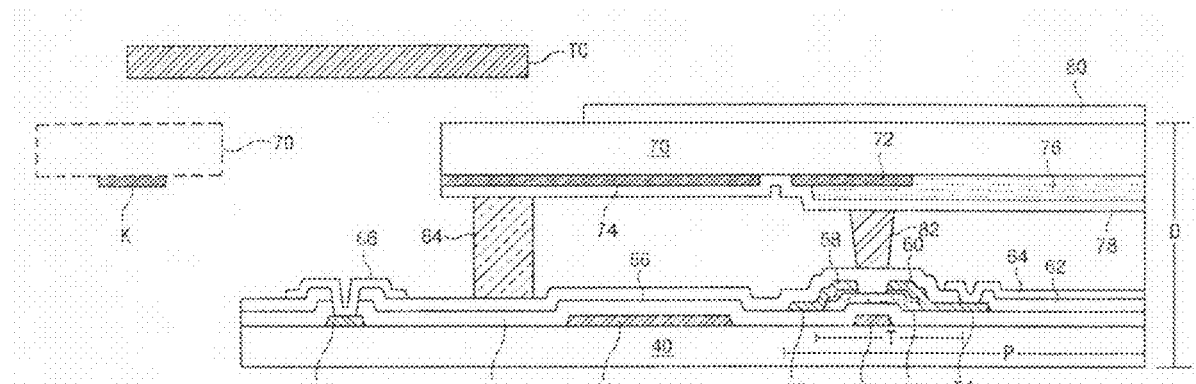
FIG. 2 is a schematic cross-sectional view of an LCD device according to the related art.
Figure 3:
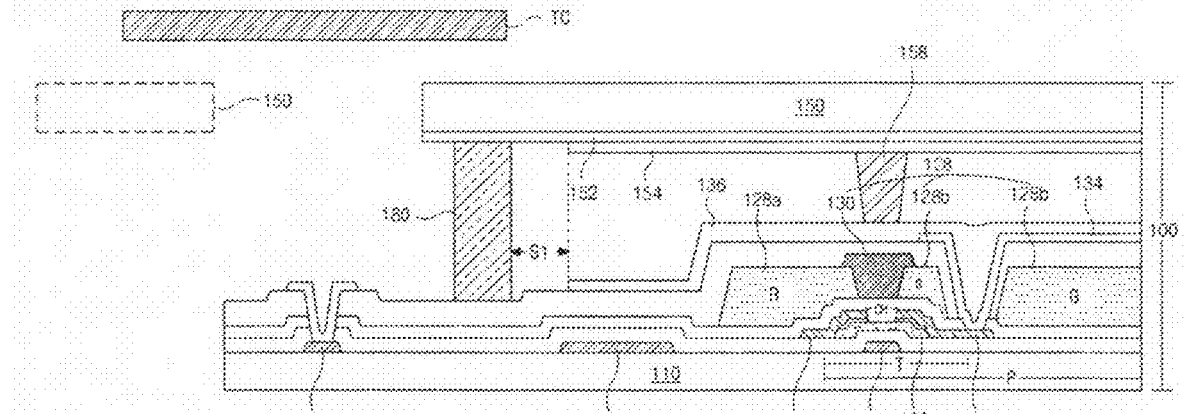
FIG. 3 is a schematic cross-sectional view of a COT type LCD device according to the related art.
Figure 4:
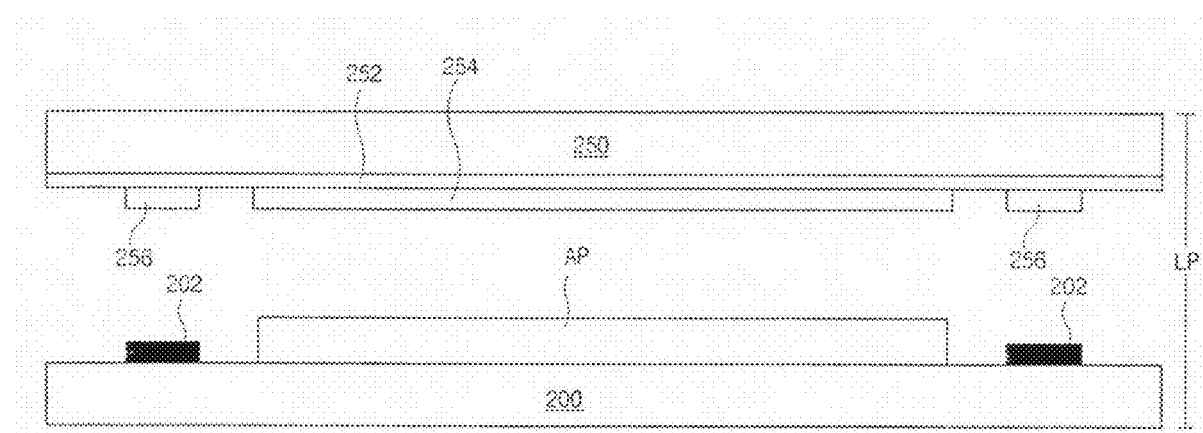
FIG. 4 is a schematic cross-sectional view of a COT type LCD device according to a first embodiment of the present invention.

FIG. 4 is a schematic cross-sectional view of a COT type LCD device according to a first embodiment of the present invention. As shown in FIG. 4, a liquid crystal panel "LP" for a COT type LCD device includes first and second substrates 200 and 250 facing each other. Array elements "AP" including a color filter layer and a TFT are formed on the first substrate 200 and a first alignment key 202 is formed in a peripheral portion of the first substrate 200. The first alignment key 202 may be formed of the same material and the same layer as the array elements AP. A common electrode 252 and an orientation film 254 are sequentially formed on the second substrate 250. In addition, a second alignment key 256 is formed in a peripheral portion of the second substrate 250. The orientation film 254 may be formed using a printing method or an inkjet method.

When the orientation film 254 is formed using a printing method, an orientation material, such as polyimide, is printed onto the second substrate 250 using a printing plate having a predetermined pattern corresponding to the orientation film 254. An alignment key pattern corresponding to the second alignment key 256 may be further formed in a peripheral portion of the printing plate. Accordingly, the second alignment key 256 is formed in the peripheral portion of the second substrate 250 simultaneously with the orientation film 254. The second alignment key 256 may be formed of a colorful resin, such as a resin having a pigment, instead of an orientation material. A colorful resin and an orientation material are coated on the printing plate, and then the colorful resin and the orientation material are printed onto the second substrate 250.

When the orientation film 254 is formed using an inkjet method, an orientation material is dropped onto the second substrate from an inkjet head. Since the movement of the inkjet head is easily controlled, the inkjet head may be programmed to form the second alignment key 256 in the peripheral portion of the second substrate 250. Moreover, the second alignment key 256 may be formed using a laser marking method. A laser marking method melts a substrate with a laser beam to form the second alignment key 256.

Figure 5:
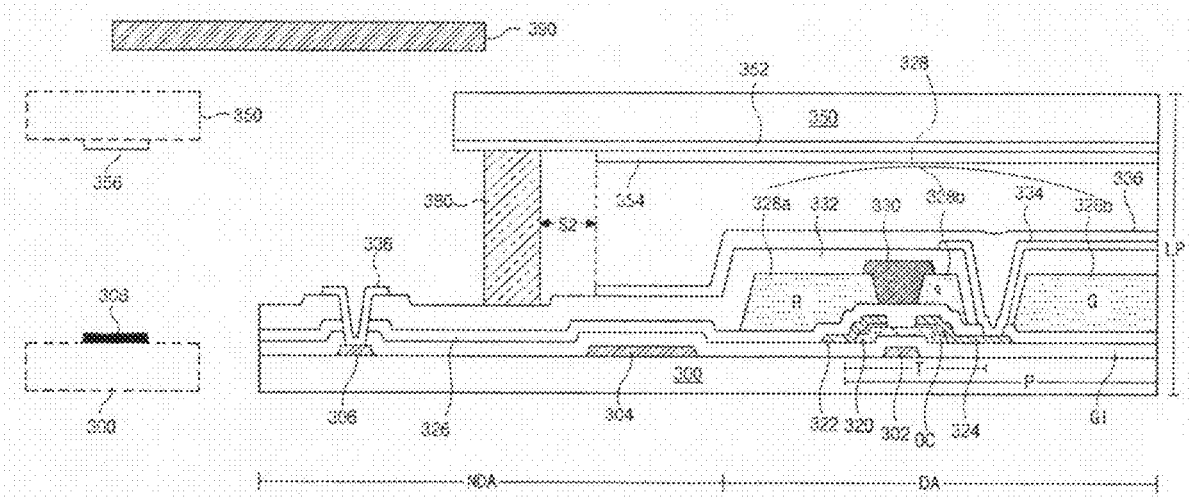
FIG. 5 is a detailed cross-sectional view of a COT type LCD device according to a first embodiment of the present invention.

FIG. 5 is a detailed cross-sectional view of a COT type LCD device according to a first embodiment of the present invention. As shown in FIG. 5, a COT type LCD device includes a liquid crystal panel "LP" and a top case 390 surrounding the liquid crystal panel "LP." The liquid crystal panel "LP" includes first and second substrates 300 and 350 having a display area "DA" used for displaying images and a non-display area "NDA" surrounding the display area "DA." The display area "DA" includes a plurality of pixel regions "P" according to a size and a resolution of an LCD device. A gate line 304 and a data line (not shown) crossing each other to define the pixel region "P" are formed on the first substrate 300. A thin film transistor (TFT) "T" including a gate electrode 302, an active layer 320, a source electrode 322 and a drain electrode 324 is connected to the gate line 304 and the data line. A gate pad 306 is formed at one end of the gate line 304 and a data pad (not shown) is formed at one end of the data line. A passivation layer 326 is formed on the TFT "T." A color filter layer 328 including red, green and blue sub-color filters (328a, 328b and not shown) and a black matrix 330 are formed on the first substrate 300 having the TFT "T." The color filter layer 328 corresponds to the pixel region "P" and the black matrix 330 corresponds to the TFT "T." A planarization layer 332 is formed on the color filter layer 328 and the black matrix 330. A transparent pixel electrode 334 contacting the drain electrode 324 is formed on the planarization layer 332, and a first orientation film 336 of polyimide is formed on the pixel electrode 334. A first alignment key 308 may be formed of the same material and the same layer as a layer constituting the TFT "T" in a peripheral portion of the first substrate 300.

A common electrode 352 is formed on the second substrate 350 and a second orientation film 354 is formed on the common electrode 352. In addition, a second alignment key 356 is formed in a peripheral portion of the second substrate 350. The second orientation film 354 may be formed using a printing method or an inkjet method.

When the second orientation film 354 is formed using a printing method, an orientation material, such as polyimide, is printed onto the second substrate 350 using a printing plate having a predetermined pattern corresponding to the orientation film 354. An alignment key pattern corresponding to the second alignment key 356 may be further formed at a peripheral portion of the printing plate. Accordingly, the second alignment key 356 is formed at the peripheral portion of the second substrate 350 simultaneously with the orientation film 354. The second alignment key 356 may be formed of a colorful resin, such as a resin having a pigment, instead of an orientation material. A colorful resin and an orientation material are coated on the printing plate, and then the colorful resin and the orientation material are printed onto the second substrate 350. When the orientation film 354 is formed using an inkjet method, an orientation material is dropped onto the second substrate from an inkjet head. Since the movement of the inkjet head is easily controlled, the inkjet head may be programmed to form the second alignment key 356 at the peripheral portion of the second substrate 350. Moreover, the second alignment key 356 may be formed using a laser marking method. A laser marking method melts a substrate with a laser beam to form the second alignment key 356.

The first and second substrates 300 and 350 are aligned with each other using the first and second alignment keys 308 and 356. A charge-coupled device (CCD) camera may be used for aligning the first and second alignment keys 308 and 356. Accordingly, a predetermined distance from a sealant 380 to the orientation films 336 and 354 is minimized and thus reducing fabrication costs. After attaching the first and second substrates 300 and 350, portions of the first and second substrates 300 and 350 having the first and second alignment keys 308 and 356 are cut away to expose the gate pad 306 and the data pad.

A fabrication process of the first substrate 300 is illustrated hereinafter. After forming the gate line 304 and the gate electrode 302 on the first substrate 300, a gate insulating layer "GI" is formed on the gate line 304 and the gate electrode 302. Next, the active layer 320 and the ohmic contact layer "OC" are formed on the gate insulating layer "GI" corresponding to the gate electrode 302. The active layer 320 may include intrinsic amorphous silicon (a-Si:H) and the ohmic contact layer "OC" may include impurity-doped amorphous silicon (n+ a-Si:H or p+ a-Si:H). Next, the source and drain electrodes 322 and 324 spaced apart from each other are formed on the ohmic contact layer "OC" and the data line (not shown) contacting the source electrode 322 is formed on the gate insulating layer "GI." Next, a passivation layer is formed on the source and drain electrodes 322 and 324. The passivation layer may include one of an inorganic insulating material, such as silicon nitride (SiNx) and silicon oxide ($SiO_2$). Next, the color filter layer 328 and the black matrix 330 are formed on the passivation layer. A planarization layer 332 is then formed on the color filter layer 328 and the black matrix 330. The planarization layer 332 may include an organic insulating material, such as benzocyclobutene (BCB) and acrylic resin. Next, after the pixel electrode 334 is formed on the planarization layer 332, the first orientation film 336 is formed on the pixel electrode 334. However, since the top case 390 may not completely shield a light leakage through a portion adjacent to the sealant 380, a light-shielding pattern is required.

Figure 6:
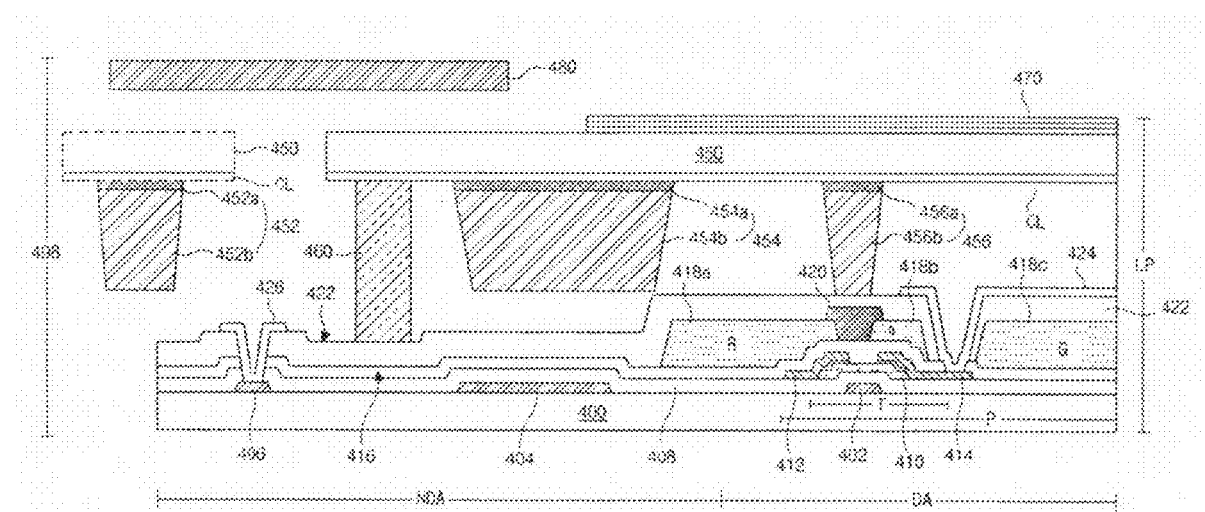
FIG. 6 is a schematic cross-sectional view of a COT type LCD device according to a second embodiment of the present invention.

FIG. 6 is a schematic cross-sectional view of a COT type LCD device according to a second embodiment of the present invention. As shown in FIG. 6, a COT type LCD device 498 includes a liquid crystal panel "LP" and a top case 480 surrounding the liquid crystal panel "LP." The liquid crystal panel "LP" includes first and second substrates 400 and 450 attached with a sealant 460, and a polarization film 470 is formed on an outer surface of the second substrate 450. The liquid crystal panel "LP" has a display area "DA" used for displaying images and a non-display area "NDA" surrounding the display area "DA." The display area "DA" includes a plurality of pixel regions "P" according to a size and a resolution of an LCD device.

A gate line 404 and a data line (not shown) crossing each other to define the pixel region "P" are formed on the first substrate 400. A thin film transistor (TFT) "T" including a gate electrode 402, an active layer 410, a source electrode 412 and a drain electrode 414 is connected to the gate line 404 and the data line. A gate pad 406 is formed at one end of the gate line 404 and a data pad (not shown) is formed at one end of the data line. A passivation layer 416 is formed on the TFT "T." A color filter layer 418 including red, green and blue sub-color filters (418a, 418b and not shown) and a black matrix 420 are formed on the first substrate 400 having the TFT "T." The color filter layer 418 corresponds to the pixel region "P" and the black matrix 420 corresponds to the TFT "T." A planarization layer 422 is formed on the color filter layer 418 and the black matrix 420. A transparent pixel electrode 424 contacting the drain electrode 414 is formed on the planarization layer 422. Even though not shown in FIG. 6, a first orientation film of polyimide may be formed on the pixel electrode 424, and a first alignment key may be formed of the same material and in the same layer as a layer constituting the TFT "T" in a peripheral portion of the first substrate 400.

A common electrode "CL" is formed on the second substrate 450. In addition, a second alignment key 452, a light-shielding pattern 454 and a patterned spacer 456 are formed on the common electrode "CL." The second alignment key 452 may be formed in a peripheral portion of the second substrate 450 corresponding to the first alignment key (not shown). The light-shielding pattern 454 may be formed to correspond to a periphery of the top case 480, and the patterned spacer 456 may be formed to correspond to the TFT "T." Each of the second alignment key 452, the light-shielding pattern 454 and the patterned spacer 456 may have a first sub-layer 452a, 454a and 456a and a second sub-layer 452b, 454b and 456b formed using a single mask process.

Figure 7A:
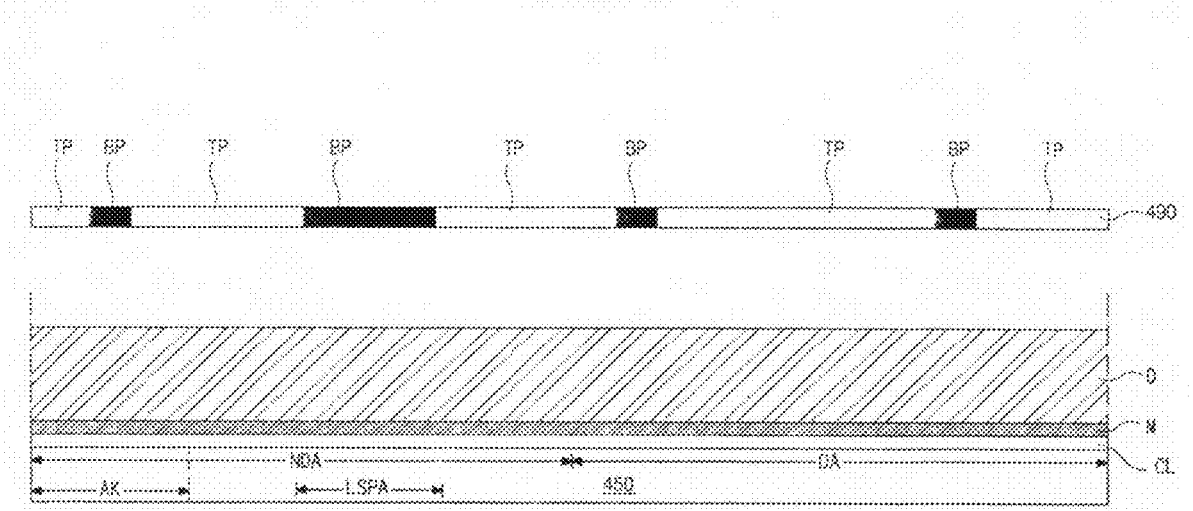
FIGS. 7A to 7C are schematic cross-sectional views showing a fabrication process of a second substrate for a COT type LCD device according to the second embodiment of the present invention.
Figure 7B:
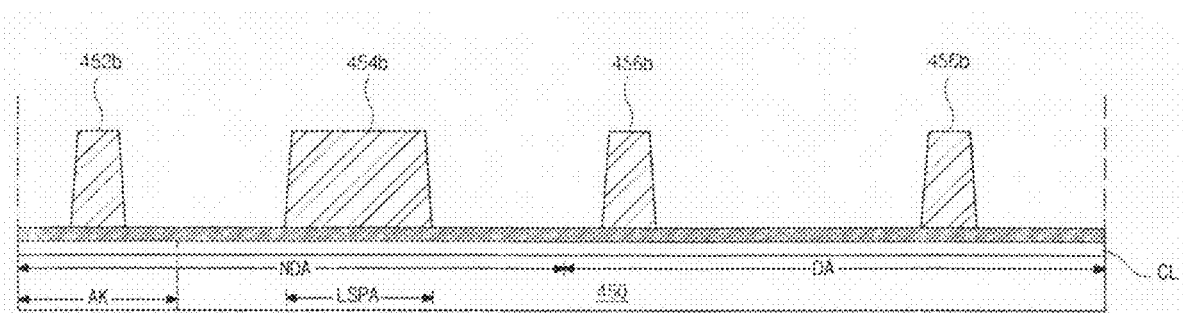
Figure 7C:
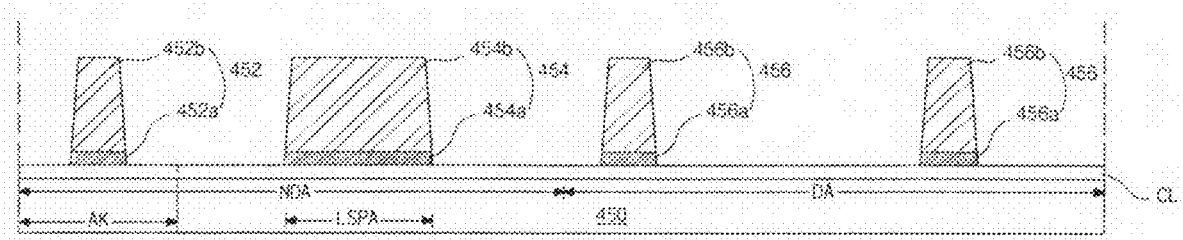

FIGS. 7A to 7C are schematic cross-sectional views showing a fabrication process of a second substrate for a COT type LCD device according to a second embodiment of the present invention.

In FIG. 7A, a common electrode "CL" is formed on a second substrate 450 having a display are "DA" and a non-display area "NDA" by depositing one of indium-tin-oxide (ITO) and indium-zinc-oxide (IZO). An opaque material layer "M" is formed on the common electrode "CL" and an organic material layer "O" is formed on the opaque material layer "M." The opaque material layer "M" may include an opaque material shielding light such as chromium oxide (CrOx), and the organic material layer "O" may include a photosensitive transparent organic material. In addition, the photosensitive transparent organic material may have a positive type or a negative type. For illustration, a positive type organic material is used in FIGS. 7A to 7C. Further, the non-display area "NDA" may include an alignment key area "AK" and a light-shielding pattern area "LSPA" where a second alignment key and a light-shielding pattern are formed in a subsequent process, respectively. The light-shielding pattern area "LSPA" is defined to surround the display area "DA." After forming the organic material layer "O," a mask 490 having a transmissive portion "TP" and a blocking portion "BP" is disposed over the organic material layer "O." Next, the organic material layer "O" is exposed to light through the mask 490 and then the exposed organic material layer "O" is developed.

In FIG. 7B, first, second and third organic material patterns 452b, 454b and 456b corresponding to the blocking portion "BP" of the mask 490 are formed on the opaque material layer "M." The first and second organic material patterns 452b and 454b are formed in the alignment key area "AK" and the light-shielding pattern area "LSPA," respectively. In addition, the third organic material pattern 456b is formed in the display area "DA" and functions as a spacer for maintaining a uniform cell gap of a liquid crystal panel. Next, the opaque material layer "M" is patterned using the first, second and third organic material patterns 452b, 454b and 456b as an etch mask.

In FIG. 7C, first, second and third opaque material patterns 452a, 454a and 456a are formed on the common electrode "CL." Accordingly, a second alignment key 452 having the first opaque material pattern 452a and the first organic material pattern 452b is formed in the alignment key area "AK" and a light-shielding pattern 454 having the second opaque material pattern 454a and the second organic material pattern 454b is formed in the light-shielding pattern area "LSPA." In addition, a patterned spacer 456 having the third opaque material pattern 456a and the third organic material pattern 456b is formed in the display area "DA." The patterned spacer 456 may be disposed at a random position of the display area "DA." As a result, the second alignment key 452, the light-shielding pattern 454 and the patterned spacer 456 are formed over the second substrate 450 using a single mask process.

Figure 8:
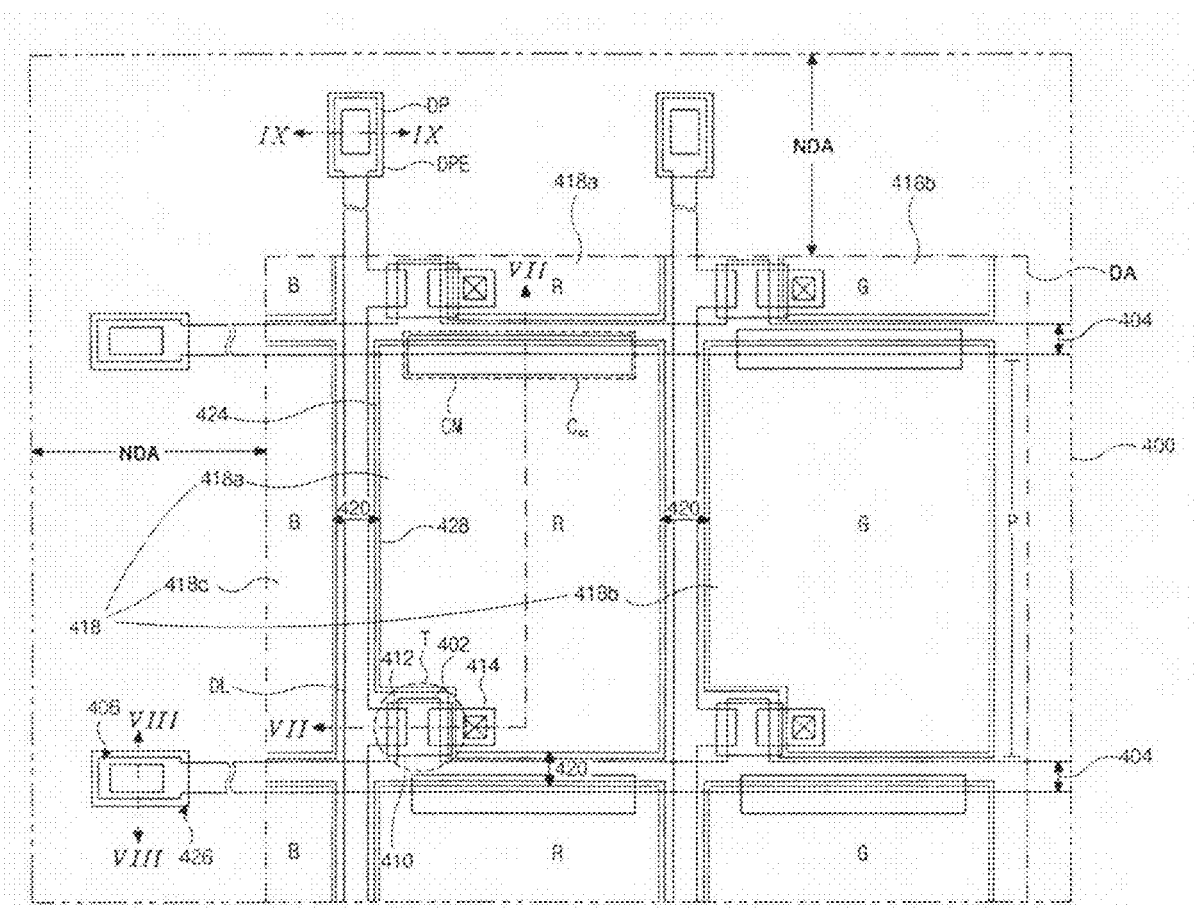
FIG. 8 is a schematic plan view of a first substrate for a COT type LCD device according to the second embodiment of the present invention.

FIG. 8 is a schematic plan view of a first substrate for a COT type LCD device according to a second embodiment of the present invention. As shown in FIG. 8, a gate line 404 and a data line "DL" crossing each other to define a pixel region "P" are formed on a first substrate 400 having a display area "DA" and a non-display area "NDA." A gate pad 406 is formed at one end of the gate line 404 and a data pad "DP" is formed at one end of the data line "DL." A thin film transistor (TFT) "T" including a gate electrode 402, an active layer 410, a source electrode 412 and a drain electrode 414 are connected to the gate line 404 and the data line "DL." A color filter layer 418 including red, green and blue sub-color filters 418a, 418b and 418c is formed in the pixel region "P" and a black matrix (not shown) is formed to correspond to the TFT "T." A transparent pixel electrode 424 contacting the drain electrode 414 is formed on the color filter layer 418. In addition, a capacitor electrode "CM" having an island shape may be formed to overlap a portion of the gate line 404. The capacitor electrode "CM" may be connected to the pixel electrode 424, thereby the capacitor electrode "CM" and the overlapping portion of the gate line 404 constituting a storage capacitor "$C_{ST}$."

Figure 9:
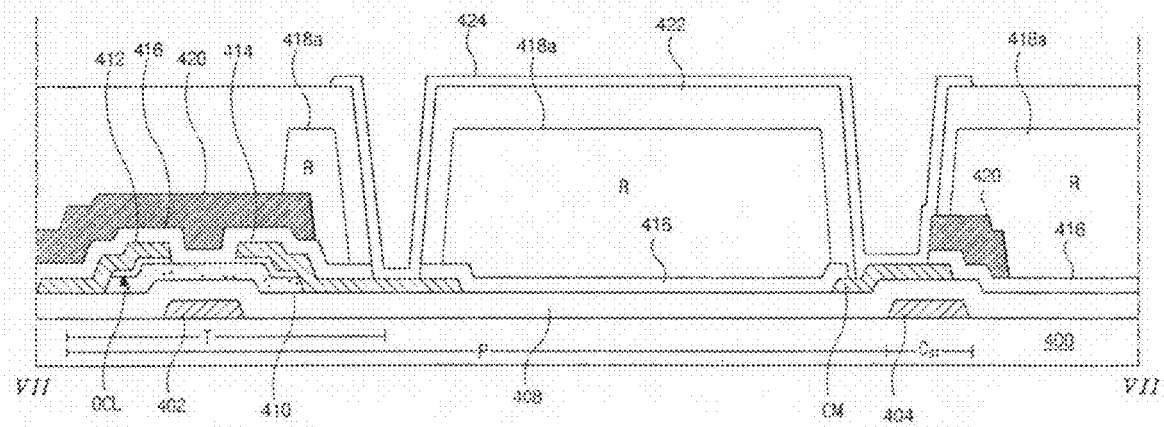
FIG. 9 is a schematic cross-sectional view, which is taken along a line "VII-VII" of FIG. 8, showing a first substrate for a COT type LCD device according to the second embodiment of the present invention.
Figure 10:
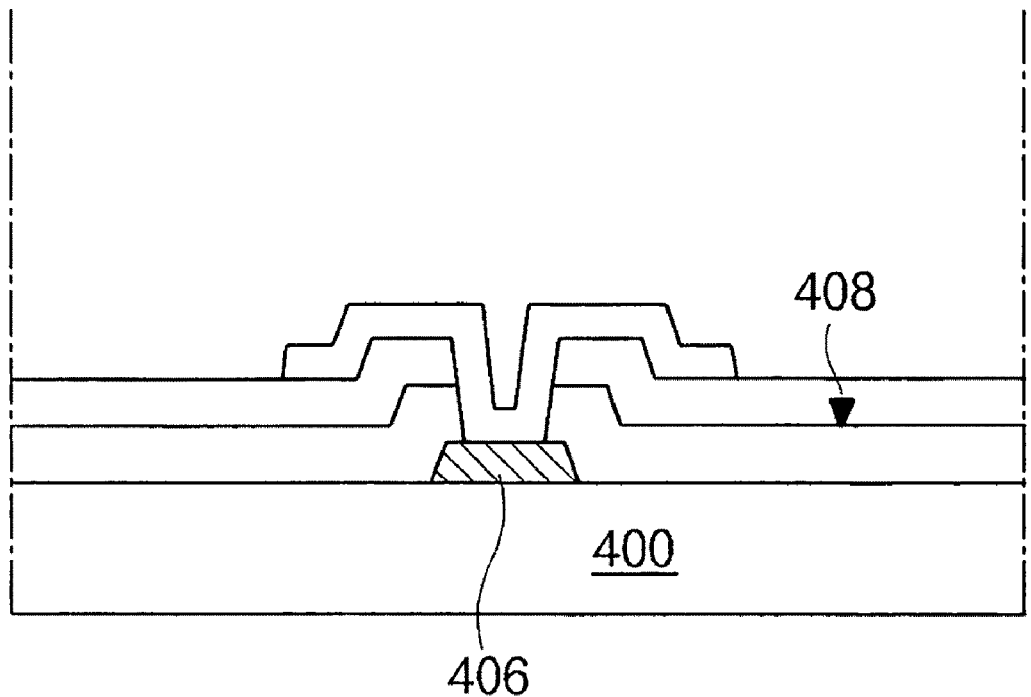
FIG. 10 is a schematic cross-sectional view, which is taken along a line "VIII-VIII" of FIG. 8, showing a first substrate for a COT type LCD device according to the second embodiment of the present invention.
Figure 11:
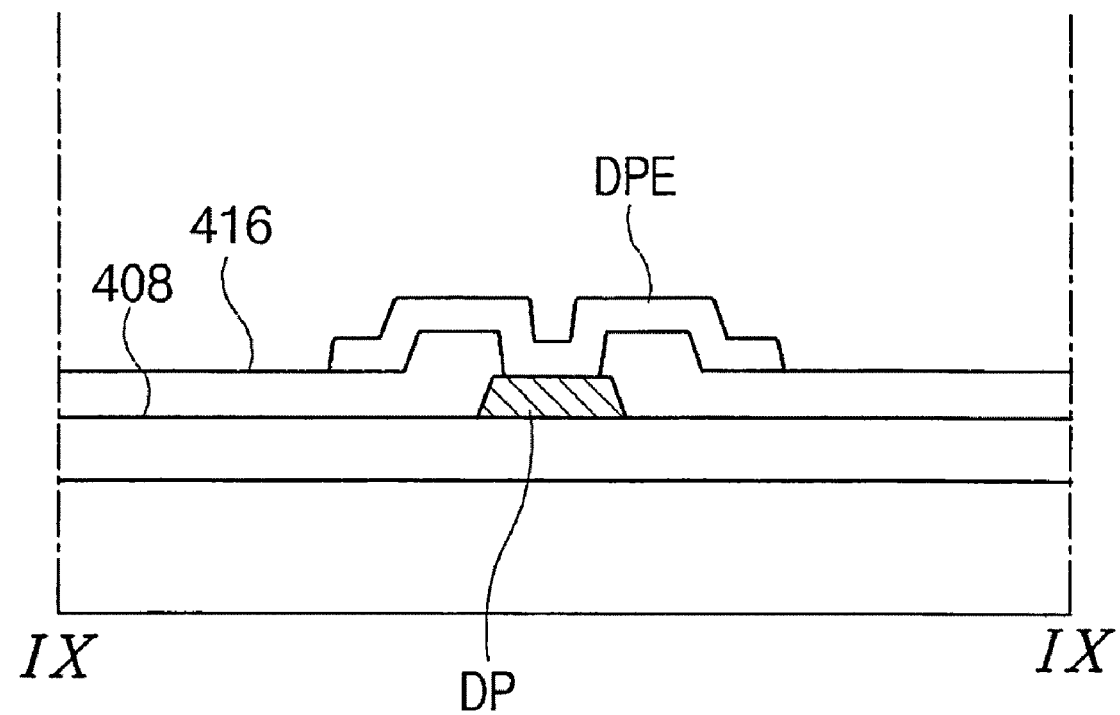
FIG. 11 is a schematic cross-sectional view, which is taken along a line "IX-IX" of FIG. 8, showing a first substrate for a COT type LCD device according to the second embodiment of the present invention.

FIGS. 9, 10 and 11 are schematic cross-sectional views showing a first substrate for a COT type LCD device according to a second embodiment of the present invention. FIG. 9 is taken along a line "VII-VII" of FIG. 8, FIG. 10 is taken along a line "VIII-VIII" of FIG. 8, and FIG. 11 is taken along a line "IX-IX" of FIG. 8.

As shown in FIGS. 9, 10 and 11, a gate line 404, a gate pad 406 and a gate electrode 402 are formed on a first substrate 400. The gate pad 406 and gate electrode 402 are connected to the gate line 404. A gate insulating layer 408 is formed on the gate line 404, the gate pad 406 and the gate electrode 402. The gate insulating layer 408 may include an inorganic insulating materials, such as silicon nitride (SiNx) and silicon oxide ($SiO_2$). An active layer 410 and an ohmic contact layer "OCL" having an island shape are sequentially formed on the gate insulating layer 408 corresponding to the gate electrode 402. Source and drain electrodes 412 and 414 spaced from each other are formed on the ohmic contact layer "OCL." A data line "DL" (of FIG. 8) and a data pad "DP" connected to the data line "DL" (of FIG. 8) are simultaneously formed with the source and drain electrode 412 and 414. The data line "DL" (of FIG. 8) is connected to the source electrode 412 and crosses the gate line 404 to define a pixel region "P." The source electrode 412, the drain electrode 414, the data line "DL" (of FIG. 8) and the data pad "DP" may include a conductive metallic material. The gate electrode 402, the active layer 210, the ohmic contact layer "OCL," the source electrode 412 and the drain electrode 414 constitute a thin film transistor (TFT) "T." A passivation layer 416 of an inorganic insulating material is formed on the TFT "T."

A black matrix 420 is formed on the passivation layer 416 to correspond to the TFT "T," the gate line 404 and the data line "DL" (of FIG. 8). The black matrix 420 over the gate line 404 and the data line "DL" (of FIG. 8) may be omitted in a high aperture ratio structure LCD device. A color filter layer 418 including red, green and blue sub-color filters 418a, 418b and 418c (of FIG. 8) is formed in the pixel region "P." In addition, a planarization layer 422 of a transparent organic material is formed on the black matrix 420 and the color filter layer 418. A transparent pixel electrode 424 contacting the drain electrode 414 is formed on the planarization layer 422.

The first substrate 400 of FIGS. 8, 9, 10 and 11 and the second substrate 450 of FIGS. 7A to 7C are attached with the sealant 460 (of FIG. 6) to constitute a liquid crystal panel "LP" (of FIG. 6). The sealant 460 (of FIG. 6) is formed between the gate line 404 (of FIG. 6) and the gate pad 406 (of FIG. 6) and between the data line "DL" (of FIG. 8) and the data pad "DP" (of FIG. 8). The first and second substrates 400 and 450 (of FIG. 6) are aligned with each other using the first alignment key (not shown) and the second alignment key 452 (of FIG. 6). For example, the first and second substrates 400 and 450 (of FIG. 6) may be put together in an incomplete alignment state and then the alignment state of the first and second substrates 400 and 450 (of FIG. 6) may be minutely adjusted using the first alignment key (not shown) and the second alignment key 452 (of FIG. 6). Then, the first and second substrates 400 and 450 (of FIG. 6) may be attached in a complete alignment state. After attaching the first and second substrates 400 and 450 (of FIG. 6), portions of the first and second substrates 400 and 450 (of FIG. 6) having the first alignment key (not shown) and the second alignment key 452

(of FIG. 6) may be cut away to expose the gate pad 406 (of FIG. 6) and the data pad "DP" (of FIG. 8).

When the first and second substrates 400 and 450 (of FIG. 6) move to adjust the alignment state thereof minutely, the second organic material pattern 454b of the light-shielding pattern 454 may contact a top layer, for example, the planarization layer 422 (of FIG. 6) of the first substrate 400. As a result, it is difficult to move the first and second substrates 400 and 450 (of FIG. 6) due to a friction between the second organic material pattern 454b and the top layer. To solve these problems, an exemplary structure of the light-shielding pattern 454 is illustrated hereinafter.

Figure 12:
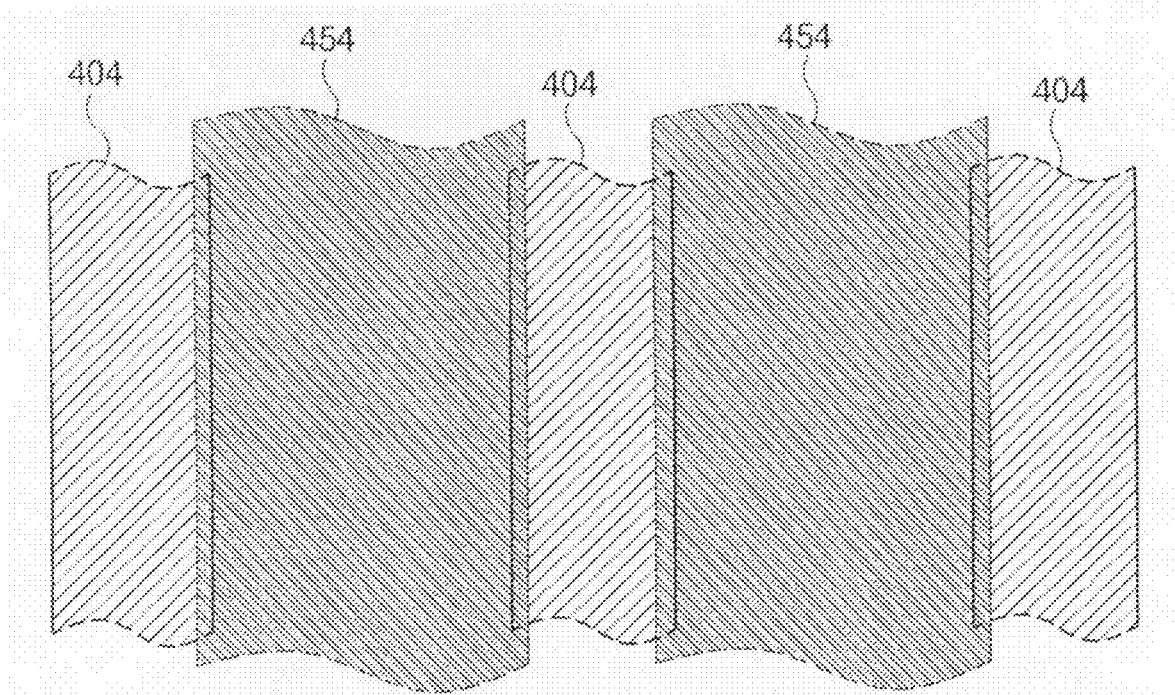
FIG. 12 is a schematic plan view showing a light-shielding pattern for a COT type LCD device according to the second embodiment of the present invention.

FIG. 12 is a schematic plan view showing a light-shielding pattern for a COT type LCD device according to a second embodiment of the present invention. As shown in FIG. 12, a plurality of gate lines 404 are formed on a second substrate (not shown). A light-shielding pattern 454 is formed between adjacent gate lines 404 to reduce a contact area of the light-shielding pattern 454 and the top layer (not shown). Since the gate lines 404 also shield light, light may be completely shielded in FIG. 10.

Figure 13:
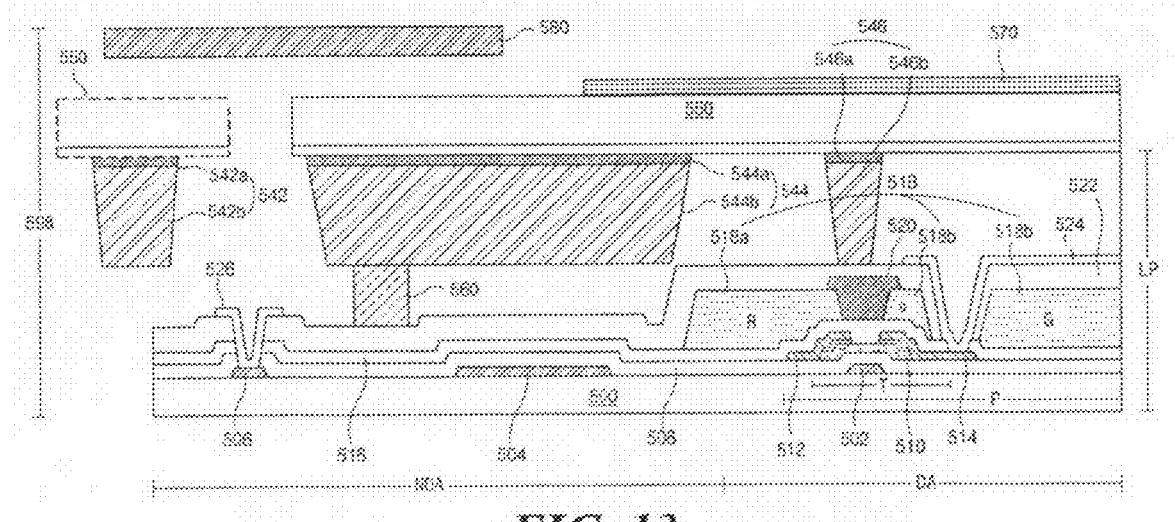
FIG. 13 is a schematic cross-sectional view of a COT type LCD device according to a third embodiment of the present invention.

FIG. 13 is a schematic cross-sectional view of a COT type LCD device according to a third embodiment of the present invention. As shown in FIG. 13, a COT type LCD device 598 includes a liquid crystal panel "LP" and a top case 580 surrounding the liquid crystal panel "LP." The liquid crystal panel "LP" includes first and second substrates 500 and 550 attached with a sealant 560, and a polarization film 570 is formed on an outer surface of the second substrate 550. The liquid crystal panel "LP" has a display area "DA" used for displaying images and a non-display area "NDA" surrounding the display area "DA." The display area "DA" includes a plurality of pixel regions "P" according to a size and a resolution of an LCD device.

A gate line 504 and a data line (not shown) crossing each other to define the pixel region "P" are formed on the first substrate 500. A thin film transistor (TFT) "T" including a gate electrode 502, an active layer 510, a source electrode 512 and a drain electrode 514 is connected to the gate line 404 and the data line. A gate pad 506 is formed at one end of the gate line 504 and a data pad (not shown) is formed at one end of the data line. A passivation layer 516 is formed on the TFT "T." A color filter layer 518 including red, green and blue sub-color filters (518a, 518b and not shown) and a black matrix 520 are formed on the first substrate 500 having the TFT "T." The color filter layer 518 corresponds to the pixel region "P" and the black matrix 520 corresponds to the TFT "T." A planarization layer 522 is formed on the color filter layer 518 and the black matrix 520. A transparent pixel electrode 524 contacting the drain electrode 514 is formed on the planarization layer 522. Although not shown in FIG. 13, a first orientation film of polyimide may be formed on the pixel electrode 524, and a first alignment key may be formed of the same material and in the same layer as a layer constituting the TFT "T" in a peripheral portion of the first substrate 500.

A common electrode "CL" is formed on the second substrate 550. In addition, a second alignment key 552, a light-shielding pattern 554 and a patterned spacer 556 are formed on the common electrode "CL." The second alignment key 552 may be formed in a peripheral portion of the second substrate 550 corresponding to the first alignment key (not shown) of the first substrate 500. The light-shielding pattern 554 may be formed to correspond to a periphery of the top case 580 and the sealant 560. In addition or in the alternative, the patterned spacer 556 may be formed to correspond to the TFT "T." Each of the second alignment key 552, the light-shielding pattern 554 and the patterned spacer 556 may have a first sub-layer 552a, 554a and 556a and a second sub-layer 552b, 554b and 556b formed using a single mask process. The first sub-layer 552a, 554a and 556a may include an opaque metallic material and the second sub-layer 552b, 554b and 556b may include a transparent organic material.

Since the light-shielding pattern 554 extends beyond the sealant 560 and the sealant 560 is formed on the light-shielding pattern 554, a margin for the top case 580 is improved and a height of the sealant 560 is reduced. In addition, even though not shown in FIG. 13, the light-shielding pattern 554 may be formed between adjacent gate lines 504 and between adjacent data lines to reduce a contact area of the light-shielding pattern 554 and a top layer of the first substrate 500. Since the gate lines 504 and the data lines also shield light, light may be completely shielded in a peripheral portion of the liquid crystal panel "LP."

Figure 14:
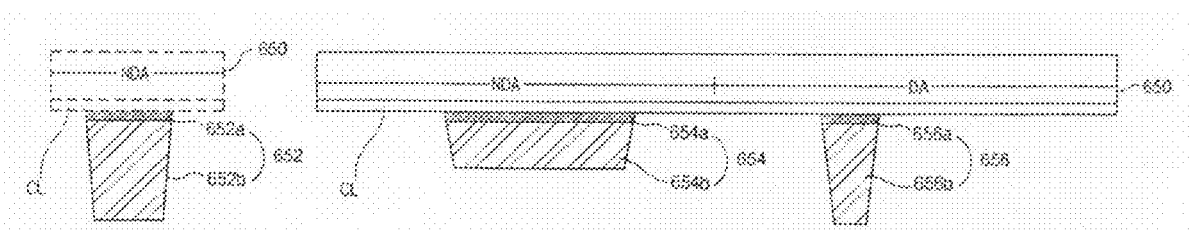
FIG. 14 is a schematic cross-sectional view showing a second substrate for a COT type LCD device according to a fourth embodiment of the present invention.

FIG. 14 is a schematic cross-sectional view showing a second substrate for a COT type LCD device according to a fourth embodiment of the present invention. As shown in FIG. 14, a common electrode "CL" is formed on a second substrate 650 having a display area "DA" used for displaying images and a non-display area "NDA" surrounding the display area "DA." A second alignment key 652, a light-shielding pattern 654 and a patterned spacer 656 are formed on the common electrode "CL." The second alignment key 652 and the light-shielding pattern 654 are formed in the non-display area "DA" and the patterned spacer 656 is formed in the display area "DA." Each of the second alignment key 652, the light-shielding pattern 654 and the patterned spacer 656 may have a first sub-layer 652a, 554a and 656a and a second sub-layer 652b, 654b and 656b formed using a single mask process. The first sub-layer 652a, 654a and 656a may include an opaque material and the second sub-layer 652b, 654b and 656b may include a transparent organic material.

The second alignment key 652, the light-shielding pattern 654 and the patterned spacer 656 is formed using a mask having a half-transmissive portion. Accordingly, the patterned spacer 656 may have a height greater than the light-shielding pattern 654 because the second sub-layer 656b of the patterned spacer 656 is thicker than the second sub-layer 654b of the light-shielding pattern 654. As a result, the light-shielding pattern 654 may not contact a top layer of the first substrate even when the first and second substrates for the liquid crystal panel move to adjust the alignment state thereof minutely. Therefore, an alignment error due to friction between the second sub-layer 654b of light-shielding pattern 654 and the top layer of the first substrate is prevented.

Figure 15A:
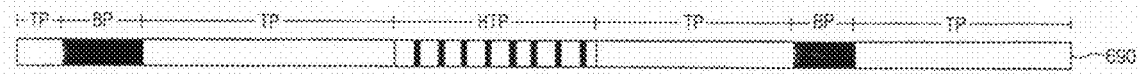
FIGS. 15A to 15B are schematic cross-sectional view showing a fabrication process of a second substrate for a COT type LCD device according to the fourth embodiment of the present invention.
Figure 15A:
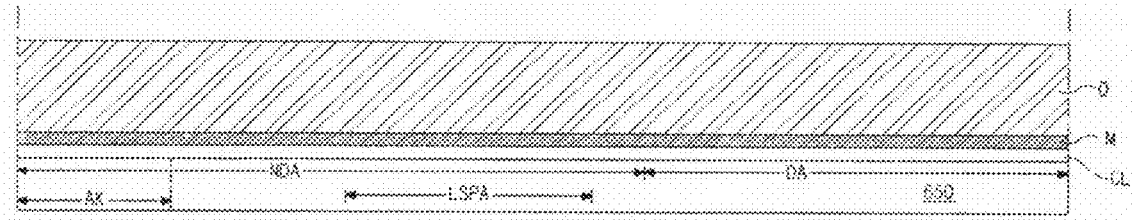
Figure 15B:
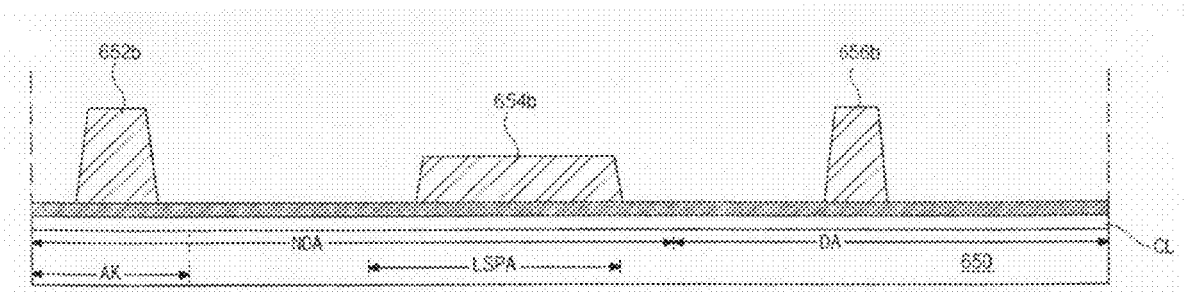

FIGS. 15A to 15B are schematic cross-sectional view showing a fabrication process of a second substrate for a COT type LCD device according to a fourth embodiment of the present invention. As shown in FIG. 15A, a common electrode "CL" is formed on a second substrate 650 having a display area "DA" used for displaying images and a non-display area "NDA" surrounding the display area "DA." The common electrode "CL" may include one of transparent conductive materials, such as indium-tin-oxide (ITO) and indium-zinc-oxide (IZO). Next, an opaque material layer "M" and an organic material layer "O" are sequentially formed on the common electrode "CL." The opaque material layer "M" may include an opaque material shielding light such as chromium oxide (CrOx), and the organic material layer "O" may include a photosensitive transparent organic material. In addition, the photosensitive transparent organic material may have a positive type or a negative type. For illustration, a positive type organic material is used in FIGS. 15A to 15C.

The non-display area "NDA" may include an alignment key area "AK" and a light-shielding pattern area "LSPA" where a second alignment key and a light-shielding pattern are formed in a subsequent process, respectively. The light-shielding pattern area "LSPA" is defined to surround the display area "DA." After forming the organic material layer "O," a mask 690 having a transmissive portion "TP," a half-transmissive portion "HTP" corresponding to the light shielding pattern area "LSPA," and a blocking portion "BP" is disposed over the organic material layer "O." The half-transmissive portion "HTP" has a light transmittance lower than the transmissive portion "TP" and higher than the blocking portion "BP." In addition, the half-transmissive portion "HTP" may be formed of a half-tone film or a slit. Next, the organic material layer "O" is exposed to a light through the mask 690 and then the exposed organic material layer "O" is developed.

In FIG. 15B, first, second and third organic material patterns 652b, 654b and 656b are formed on the opaque material layer "M." The second organic material pattern 654b and the third organic material pattern 656b correspond to the half-transmissive portion "HTP" and the blocking portion "BP" of the mask 690 (of FIG. 15A), respectively. Even though the blocking portion "BP" correspond to the first organic pattern 652b in FIG. 15A, the half-transmissive portion "HTP" may correspond to the first organic pattern 652b in another embodiment. Accordingly, the second organic material pattern 654b has a height lower than the third organic material pattern 656b. The first and second organic material patterns 652b and 654b are formed in the alignment key area "AK" and the light-shielding pattern area "LSPA," respectively. In addition, the third organic material pattern 656b is formed in the display area "DA" and functions as a spacer for maintaining a uniform cell gap of a liquid crystal panel. Next, the opaque material layer "M" is patterned using the first, second and third organic material patterns 652b, 654b and 656b as an etch mask.

Figure 15C:
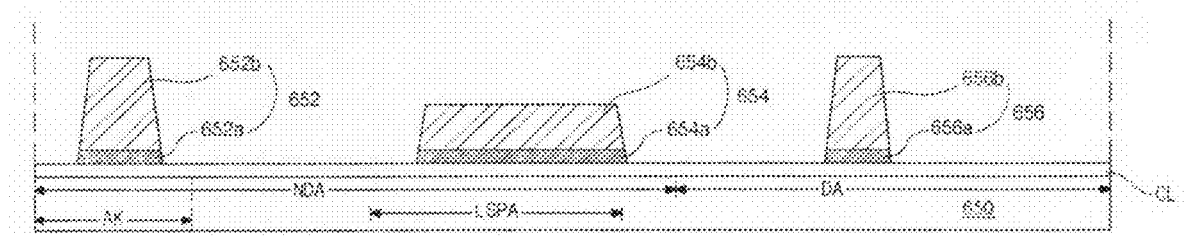

In FIG. 15C, first, second and third opaque material patterns 652a, 654a and 656a are formed on the common electrode "CL." Accordingly, a second alignment key 652 having the first opaque material pattern 652a and the first organic material pattern 652b is formed in the alignment key area "AK" and a light-shielding pattern 654 having the second opaque material pattern 654a and the second organic material pattern 654b is formed in the light-shielding pattern area "LSPA." In addition, a patterned spacer 656 having the third opaque material pattern 656a and the third organic material pattern 656b is formed in the display area "DA." The patterned spacer 656 may be disposed at a random position of the display area "DA." As a result, the second alignment key 652, the light-shielding pattern 654 and the patterned spacer 656 having a height higher than the light-shielding pattern 654 are formed over the second substrate 650 using a single mask process.

In a COT type LCD device according to the present invention, since a distance between a sealant and an orientation film is minimized, dummy space is decreased and a fabrication costs are reduced. In addition, since an alignment key, a light-shielding pattern and a patterned spacer are formed using a single mask process, a fabrication process is simplified and production yield is improved. Moreover, since a light-shielding pattern is formed between adjacent gate lines and adjacent data lines, contact area between a top layer of a first substrate and an organic material layer of a second substrate is reduced, thereby an alignment error due to friction is prevented. Furthermore, a sufficient fabrication margin for a top case is obtained by extending a light-shielding pattern to a sealant. Thus, a light-shielding pattern is formed to have a height lower than a patterned spacer using a mask having a half-transmissive portion. Accordingly, a contact area between a top layer of a first substrate and an organic material layer of a second substrate is further reduced, thereby preventing an alignment error due to friction.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal panel for a color filter on thin film transistor (COT) type liquid crystal display (LCD) device, comprising:
    forming a gate line and a data line on a first substrate having a display area and a non-display area, the non-display area is at a periphery of the display area, the gate line and the data line crossing each other to define a pixel region in the display area;
    forming a thin film transistor connected to the gate line and the data line;
    forming a color filter layer over the thin film transistor;
    forming a black matrix on the color filter layer;
    forming a pixel electrode contacting the thin film transistor on the color filter layer;
    forming a common electrode on a second substrate having the display area and the non-display area;
    forming a first alignment key on the second substrate in the non-display area;
    forming a first orientation film on the common electrode;
    forming a sealant between the first and second substrates at a boundary between the display area and the non-display area;
    attaching the first and second substrates such that the pixel electrode faces the common electrode; and
    forming a liquid crystal layer between the pixel electrode and the common electrode,
    wherein the first alignment key is simultaneously formed with the first orientation film.

2. The method according to claim 1, further comprising forming a second orientation film on the pixel electrode.

3. The method according to claim 2, wherein the first alignment key is formed using one of a printing method and an inkjet method.

4. The method according to claim 1, wherein the first alignment key is formed by partially melting a surface of the second substrate in the non-display area.

5. The method according to claim 1, further comprising forming a second alignment key on the first substrate corresponding to the first alignment key.

6. The method according to claim 5, wherein the second alignment key is simultaneously formed with the gate line and the data line.

7. The method according to claim 1, further comprising
    forming a light-shielding pattern at the boundary between the display area and the non-display area; and
    forming a patterned spacer in the display area while simultaneously forming the first alignment key.

8. The method according to claim 7, wherein the forming the first alignment key, the light-shielding pattern and the patterned spacer includes:
    forming an opaque material layer on the second substrate having the common electrode;

forming a photosensitive organic material layer on the opaque material layer;

exposing the photosensitive organic material layer through a mask having a transmissive portion and a blocking portion;

developing the photosensitive organic material layer to form first, second and third organic material patterns; and patterning the opaque material layer using the first, second and third organic material patterns to form first, second and third opaque material patterns as etch masks, wherein the first opaque material pattern and the first organic material pattern constitute the first alignment key, the second opaque material pattern and the second organic material pattern constitute the light-shielding pattern, and the third opaque material pattern and the third organic material pattern constitute the patterned spacer.

9. The method according to claim 7, wherein the forming the first alignment key, the light-shielding pattern and the patterned spacer includes:

forming an opaque material layer on the second substrate having the common electrode;

forming a photosensitive organic material layer on the opaque material layer;

exposing the photosensitive organic material layer through a mask having a transmissive portion, a half-transmissive portion and a blocking portion;

developing the photosensitive organic material layer to form first, second and third organic material patterns, the second and third organic material patterns corresponding to the half-transmissive portion and the blocking portion, respectively; and patterning the opaque material layer using the first, second and third organic material patterns to form first, second and third opaque material patterns as etch masks, wherein the first opaque material pattern and the first organic material pattern constitute the first alignment key, the second opaque material pattern and the second organic material pattern constitute the light-shielding pattern, and the third opaque material pattern and the third organic material pattern constitute the patterned spacer.

10. The method according to claim 7, wherein the light-shielding pattern overlaps the sealant.

11. The method according to claim 7, wherein the light-shielding pattern is formed between the adjacent gate lines and between the adjacent data lines.

12. A method of fabricating a color filter on thin film transistor (COT) type liquid crystal display (LCD) device, comprising:

forming a gate line and a data line on a first substrate having a display area and a non-display area, the non-display area is at a periphery of the display area, the gate line and the data line crossing each other to define a pixel region in the display area;

forming a thin film transistor connected to the gate line and the data line;

forming a color filter layer over the thin film transistor;

forming a black matrix on the color filter layer;

forming a pixel electrode contacting the thin film transistor on the color filter layer;

forming a common electrode on a second substrate having the display area and the non-display area;

forming a first alignment key on the second substrate in the non-display area;

forming a light-shielding pattern at a boundary and a patterned spacer in the display area;

forming a sealant between the first and second substrate at the boundary between the display area and the non-display area;

attaching the first and second substrates such that the pixel electrode faces the common electrode;

forming a liquid crystal layer between the pixel electrode and the common electrode;

removing a portion of the second substrate having the first alignment key; and forming a top case and a bottom case enclosing the first and second substrates therein such that the light-shielding pattern corresponds to end portions of the top case, wherein the light-shielding pattern and the patterned spacer are simultaneously formed with the first alignment key.

13. The method according to claim 12, wherein forming the first alignment key, the light-shielding pattern and the patterned spacer includes:

forming an opaque material layer on the second substrate having the common electrode;

forming a photosensitive organic material layer on the opaque material layer;

exposing the photosensitive organic material layer through a mask having a transmissive portion and a blocking portion;

developing the photosensitive organic material layer to form first, second and third organic material patterns; and patterning the opaque material layer using the first, second and third organic material patterns to form first, second and third opaque material patterns as etch masks, wherein the first opaque material pattern and the first organic material pattern constitute the first alignment key, the second opaque material pattern and the second organic material pattern constitute the light-shielding pattern, and the third opaque material pattern and the third organic material pattern constitute the patterned spacer.

14. The method according to claim 12, wherein the forming the first alignment key, the light-shielding pattern and the patterned spacer includes:

forming an opaque material layer on the second substrate having the common electrode;

forming a photosensitive organic material layer on the opaque material layer;

exposing the photosensitive organic material layer through a mask having a transmissive portion, a half-transmissive portion and a blocking portion;

developing the photosensitive organic material layer to form first, second and third organic material patterns, the second and third organic material patterns corresponding to the half-transmissive portion and the blocking portion, respectively; and patterning the opaque material layer using the first, second and third organic material patterns to form first, second and third opaque material patterns as etch masks, wherein the first opaque material pattern and the first organic material pattern constitute the first alignment key, the second opaque material pattern and the second organic material pattern constitute the light-shielding pattern, and the third opaque material pattern and the third organic material pattern constitute the patterned spacer.

* * * * *